United States Patent [19]

Bunge et al.

[11] 4,049,610

[45] Sept. 20, 1977

[54] PIGMENT PREPARATIONS

[75] Inventors: Wilhelm Bunge; Wolf-Dieter Last; Rudolf Saitner; Karlheinz Wolf, all of Leverkusen, Germany

[73] Assignee: Bayer Aktiengesellschaft, Leverkusen, Germany

[21] Appl. No.: 650,466

[22] Filed: Jan. 19, 1976

Related U.S. Application Data

[63] Continuation-in-part of Ser. No. 543,118, Jan. 22, 1975, abandoned.

[30] Foreign Application Priority Data

Jan. 22, 1974 Germany .............................. 2402839

[51] Int. Cl.$^2$ ............................................. C08F 45/36
[52] U.S. Cl. ........................ 260/31.2 N; 260/30.6 R; 260/31.6; 260/31.8 R; 260/32.8 N; 260/33.2 R; 260/33.6 UB; 260/33.6 UA; 260/37 N; 106/288 B; 106/288 Q; 106/308 N

[58] Field of Search ............... 106/288 B, 288 Q, 307, 106/308 N, 309; 260/42.16, 37 N, 30.6, 31.6, 31.2 N

[56] References Cited

U.S. PATENT DOCUMENTS

| | | | |
|---|---|---|---|
| 3,635,878 | 1/1972 | Gebura | 260/42.16 |
| 3,711,439 | 1/1973 | Loew | 260/37 N |
| 3,755,242 | 8/1973 | Reich | 260/37 N |

*Primary Examiner*—Winston A. Douglas
*Assistant Examiner*—J. V. Howard
*Attorney, Agent, or Firm*—Plumley and Tyner

[57] ABSTRACT

Pigment preparations containing 3 to 80 percent by weight of an organic or inorganic pigment, 0.5 to 85 percent by weight of a resin containing carbodiimide groups and 0 to 75 percent of an organic solvent free from amino groups are used for pigmenting synthetic high-molecular materials, especially one-component and two-component polyurethane textile coating compositions.

11 Claims, No Drawings

PIGMENT PREPARATIONS

This application is a continuation-in-part of Ser. No. 543,118, filed Jan. 19, 1976, now abandoned.

Polyurethanes for use as lacquer binders or coating materials, for example for textiles, are produced as a broad range of one-component or two-component systems which can be highly elastic or hard, free from solvent or solvent-containing. Where these materials are being pigmented, the problem arises of finding a suitable pigment vehicle, in which the pigments can be dispersed at a high concentration and without flocculation, and which is compatible over a broad range with the polyurethanes, so that it should not be necessary to keep a special pigment paste available for each special system. In the two-component systems customary in the lacquer industry, it is in most cases only the relatively low-viscosity polyol component which is available for pigmentation and in which not only carbon black or organic pigments, such as phthalocyanines, but also inorganic pigments such as yellow iron oxide or red iron oxide connot be dispersed without flocculation and thixotropic phenomena. This in the first place makes any grinding operation full of problems, and uneconomical, but also, after addition of the isocyanate component, has an adverse effect on the levelling, gloss, depth of colour, covering power and gloss retention of the cured lacquer films.

The polyurethane coating materials for textiles contain very high-molecular substances which are only of limited miscibility with one another (one-component or two-component systems) and which, even for viscosity reasons alone, do not permit any high pigment concentrations to be used.

In addition to these homogeneous polyurethanes, cellular polyurethanes, the elasticity of which can be varied to give foams ranging from hard to extremely soft, have also attained great importance. These foams are in the main coloured, shortly before foaming, in a mixing head in which polyols and polyisocyanates are intimately mixed with colour pastes in the presence of auxiliaries. As binders, such colour pastes in most cases contain polyester-polyols or polyether-polyols, of which the pigment-holding capacity, especially towards carbon black, is so low that even carbon black concentrations of 10–18% already give colour pastes which cannot be poured. When normal amounts of the colour pastes, from 3 to 5%, which as yet do not have a great influence on the mechanical behaviour of the foams, are added, a deep colouration is not achieved; instead, for example, in the case of carbon black only a grey colouration is obtained.

It has now been found that the difficulties indicated can be overcome if resins which contain carbodiimide groups are used as the pigment vehicle. Preferred materials are those resins containing carbodiimide groups, of which the 40% strength solutions in glycol monomethyl ether acetate have a viscosity, measured in the Hoppler falling ball viscometer at 25° C, in the range from 0.2 to 600 poise, preferably between 1 to 10 poise, and which contain between 0.1 and 15, preferabaly 0.5 and 5, percent by weight of carbondiimide groups. In addition to carbodiimide groups, the resin can also contain urethane, ester, ether and/or hydroxy groups.

The incorporation of pigments into these binders containing carbodiimide groups can on the one hand be carried out without solvents by using melts, but is also possible in the presence of organic solvents free from amino groups. Furthermore these exists the possibility of adding only proportions of these claimed binders to conventional polyesters, polyethers or polymethanes in order substantially to improve their pigment-binding capacity.

The preparation of carbodiimides from isocyanates, which formally takes place in accordance with the equation $2 \text{ R}-\text{NCO} \rightarrow \text{R}-\text{N}=\text{C}=\text{N}-\text{R} + CO_2$, is in itself known [Angew. Chemie, 74, 801 (1962), collective review by H. G. Khorana, Chem. Rev. 53, 145 (1953)]. The resins containing carbodiimide groups have excellent pigment-binding capacity. In addition, their compatibility with other binders is surprisingly broad and this is a prerequisite for an equally broad use of corresponding pigment preparations. In the lacquer field, this compatibility embraces not only polyurethanes but also, for example, conventional nitrocellulose lacquers, stoving lacquers based on alkyd-melamine or urea-formaldehyde resins and chlorinated rubber lacquers. In the textile coating field, they can be incorporated homogeneously both into one-component systems using various solvent combinations, and into two-component polyester-urethanes.

Solvent-free pigment preparations are suitably prepared by kneading the components in a kneader which can be heated, for example in a dispersion kneader, at temperatures which lie within or clearly above the melting range of the resin used. Instead of the kneader, kneading screws or roll mills which can be heated can also be used. After the kneading process, the cooled pigment preparation is granulated, or ground to a powder, in the usual manner.

Pigment dispersions containing solvent can be produced in conventional wet comminution equipment, such as kneaders, attrition mills, roll mills, dissolvers, rotor-stator mills, ball mills and, with particular advantage, in high speed agitator mills with circumferential speeds of 50–60 m/sec., preferably 10–20 m/sec., which contain grinding bodies the size of which corresponds approximately to 0.1–10 mm diameter, preferably 0.5–1.2 mm diameter, consisting of steel, glass, ceramic, sand or plastic. Suitable agitator mills have been described, for example, in Farbe und Lack 71, page 375 et seq. and page 464 et seq., Farbe und Lack 75, page 953et seq. and German Auslegeschrift (German Published Specification) No. 1,230,657.

There is no limitation on the pigments which can be incorporated into the solvent-free or solvent-containing pigment preparations. They can be of organic or inorganic nature. Suitable organic pigments are, for example, those of the azo, anthraquinone, azaporphine and thioindigo series and also other polycyclic pigments, for example from the quinacridone, dioxazine, naphthalenetetracarboxylic acid, perylenetetracarboxylic acid or isoindolinone series, as well as metal complex pigments or dyestuff lakes, such as Ca, Mg and Al lakes of dyestuffs containing sulphonic acid groups and/or containing carboxylic acid groups, of which a large number is known, for example from Colour Index, 2nd edition. Examples of suitable inorganic pigments are zinc sulphides, cadmium sulphides and selenides, ultramarine, titanium dioxides, iron oxides, nickel- or chromium-antimony-titanium oxides, cobalt blue, chromium oxides and chromate pigments, as well as carbon black. The pigment preparations claimed contain 3–80% of pigment, 0.5–85%, preferably 6 to 85% of a binder containing carbodiimide group and 0–75% of an organic solvent free from amino groups.

Preferred pigment preparations contain 15–80% of pigment, especially 20–50% of organic pigment or carbon black, or 30–80% of inorganic pigment, and 85–20% of the binder containing carbodiimide groups, especially 80–50 or 70–20% respectively.

Further preferred preparations are solvent-containing pigment pastes, which contain 3–70% of pigment, 1–40%, preferably 6–40% of the binder containing carbodiimide groups and 82–15% of the organic solvent.

Suitable solvents are above all solvents free from hydroxyl grouups and from amino groups, for example from the series of the esters, especially the glycol-ether esters, ethers, ketones, aromatic hydrocarbons and chlorinated hydrocarbons, such as are required for use in two-component polyurethanes.

Further suitable solvents are high-boiling solvents, which already are classifiable as plasticisers, such as are used in the lacquer and plastics industry, that is to say alkyl esters and/or arly esters of dibasic or polybasic acids such as adipic acid, phthalic acid or phosphoric acid, as well as esters of aromatic or aliphatic monocarboxylic acids with alcohols, such as glycerol triacetate. A further special possibility, when using the claimed colour pastes in polyurethane systems with reactive NCO groups, is to employ, for the preparation or dilution of the solution, products containing hydroxyl groups, of which the OH groups react with isocyanate and, after formation of the urethane, are completely built into the coloured system which has completed reacting. Examples to be mentioned are glycerol diacetate, monoethers of diethylene glycol or triethylene glycol, and short-chain ethylene oxide derivatives of phenol or its substitution products. Furthermore, it is possible, especially in the case of low-molecular modified polyurethane resins, to achieve dissolution, at temperatures around 100° C, in, for example, a linear or branched polyether, obtained from a diol and/or triol with added-on propylene oxide and/or ethylene oxide, of average molecular weight up to 5,000.

Furthermore, thickeners such as highly disperse silica, special montmorillonites, which can also contain organic ammonium bases, and fillers such as kanolin, talc or blanc fixe, can be added to the pigment pastes containing solvent.

EXAMPLE 1

A mixture of 45 g of an oxidised carbon black pigment and 55 of a polyether-urethane resin with carbodiimide groups is kneaded in a dispersion kneader, equipped with heating, of the Werner + Pfleiderer system, for 2 to 3 hours at temperatures of 90° to 140° C. The resin is prepared according to the following process:

7.6 g of 1,2-propylene glycol are added to 222 g of 1-isocyanato-3-isocyanato-methyl-3,5,5-trimethyl-cyclohexane and the mixture is warmed to 240° C, in the course of which 5 liters of $CO_2$ (25° C) are eliminated after approx. 40 minutes. 183 g of this reaction product which according to the IR spectrum contains both isocyanate groups and carbodiimide groups, are introduced, starting at 130° C, into a mixture consisting of (1) 227 g of a linear polyether of average molecular weight 2,000, prepared from propylene glycol and propylene oxide and containing 1.8% of hydroxyl groups, and (2) 127 g of 2,2-bis-(4-hydroxy-cyclohexyl)-propane, over the course of 10 minutes, during which the temperature rises to 170° C. After heating for 2 hours to 170°14 180° C, a resin which is soluble in ethyl alcohol, acetone, ethyl acetate or glycol monoethyl-ether acetate and has a melting range of 90°–110° C is left.

The kneading process with resin and carbon black pigment is carried out by producing a viscous kneadable mass, at the start of the kneading process by heating the kneader and then completing the dispersion by kneading for 2 to 3 hours in the stated temperature range. In order to be able to maintain this kneading temperature it can be necessary to cool the kneader again, after it has been heated up, because of the heat generated by the kneading. A pigment preparation is obtained, which is cooled to room temperature and then ground to a coarse powder.

This pigment concentrate is very suitable for use in colouring polyisocyanate reaction lacquers, but because of the good compatibility of the polyether-urethane resin can also be used for colouring nitrocellulose lacquers or chlorinated rubber lacquers. Thus, for example, 2.4 g of the pigment preparation, which has been ground to a coarse powder, are distributed in 70 g of a 28.6% strength solution of a branched polyester containing hydroxyl groups (hydroxyl content approx. 7.6%) in a solvent mixture of ethyl acetate, butyl acetate, glycol monoethyl-ether acetate and toluene, in a glass flask over the coarse of one hour on a shaking stand, without great expenditure of energy. After mixing in 30 g of a 75% strength solution of a polyfunctional aromatic isocyanate having an NCO content of 13%, a black reactive lacquer is obtained, which is very glossy after drying. The lacquer further diluted 2:1 with glycol monomethyl-ether acetate, when poured onto glass, allowed to run off vertically and dried, gives a thin, very glossy lacquer film with a completely uniform brownish colouration of high transparency.

If a high speed stirrer is used, 2 g of the pigment concentrate can be dissolved, without leaving specks, in 100 g of a nitrocellulose-alkyd resin lacquer of 25% solids content, in 10 to 15 minutes.

EXAMPLE 2

40 g of a copper phthalocyanine in the β-modification are dispersed in 60 g of the resin from Example 1 under the same kneading conditions, but in the temperature range of 90° to 120° C, and after cooling the product is ground to a coarse powder. A conventional stoving lacquer, consisting of 62.5 parts by weight of a non-drying alkyd resin containing 24% of oil and 43% of phthalic anhydride, 60% strength in xylene, 20.0 parts by weight of a butanol-etherified melamine resin, 55% strength in butanol, 7.5 parts by weight of xylene, 8.0 parts by weight of ethylene glycol monethyl ether and 2.0 parts by weight of glycollic acid butyl ester is pigmented as follows with the pigment concentrate:

1.5 g of the ground pigment preparation are dispersed in 100 g of the lacquer over the course of 15 minutes, by means of a high speed stirrer. The lacquer film produced from the coloured lacquer on an aluminium foil, with the aid of a 100 μm doctor blade, shows high transparency and high gloss after stoving for 30 minutes.

EXAMPLE 3

40 g of an oxidised carbon black pigment (specific surface area by the BET method: 180 $m^2/g$) are dispersed in 200 g of a 30% strength resin solution of the resin described in Example 1 in glycol monoethyl-ether acetate, over the course of 8 hours in a vibration mill, using 700 g of porcelain balls of diameters from 8 to 10 mm. The pourable pigment paste thus obtained is incorporated, with stirring, into the lacquers mentioned in Example 1 and 2, taking into account the lower carbon black pigment content of the pigment paste.

A very readily pourable pigment paste without structural viscosity is obtained by grinding 25 g of an oxidised carbon black pigment and 75 g of a 25% strength solution of the resin from Example 1 in benzyl alcohol on a cone mill. This highly concentrated pigment paste, which is very economical in use, can be employed very successfully for marking purposes.

EXAMPLE 4

20% of the yellow pigment of the formula

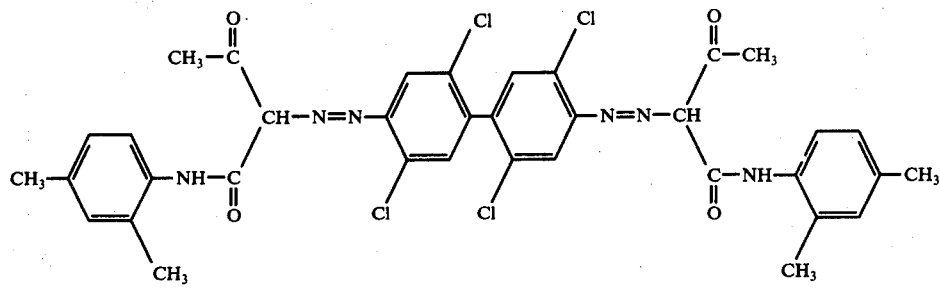

16% of a polyester-urethane resin with carbodiimide groups and 64% of glycol monoethyl-ether acetate are stirred in a high speed stirrer and then ground in a high speed agitator mill which consists of a cylindrical grinding vessel and has a shaft, provided with plane circular discs, as the mixing device. The mill contains glass beads of 0.3-0.4 mm diameter as the grinding bodies. The circumferential speed of the discs is approx. 10 m/sec.

The polyester-urethane resin can be obtained as follows: a reaction product with 22.7% of carbodiimide groups, relative to the free NCO groups, if first prepared, by heat treatment, from 1-isocyanato-3-isocyanato-methyl-3,5,5,-trimethylcyclohexane and ethylene glycol. 100 parts by weight of this pre-adduct containing NCO are reacted with a mixture of 20 g of ethylene glycol and 132 g of a polyester, containing 1.6% of hydroxyl groups, from 5 mols of adipic acid, 3.5 mols of diethylene glycol and 2.3 mols of 2,2-bis-(4-hydroxy-cyclohexyl)-propane.

The resin containing urethane groups and carbodiimide groups is soluble in acetone, ethyl acetate and glycol monomethyl-ether acetate. The viscosity of a 40% strength solution in glycol monomethyl-ether acetate in the Hoppler falling ball viscometer is 2 poise. The resin contains 1.3% of hydroxyl groups.

EXAMPLE 5

A pigment dispersion is obtained in the same way as in Example 4 when using, instead of the yellow pigment, one of the following pigments:
 a. a tetracholorothioindigo pigment (Pigment Red 88)
 b. a chlorinated copper phthalocyanine pigment (Colour Index II. No. 74,620).

EXAMPLE 6

Pigment dispersions of the following composition are prepared in the same way as in Example 4.

a. 12% of Pigment Yellow 83, 17% of polyester-urethane from Example 4 and 71% of glycol monethyl-ether acetate.

b. 18% of carbon black (surface area by the BET method: 180 m²/g, pH value of the aqueous carbon black suspension approx. 3) 27% of polyester-urethane from Example 4 and 55% of glycol monoethyl-ether acetate.

c. 60.0% of rutile titanium dioxide, 15.0% of polyester-urethane from Example 4, 0.5% of highly disperse silica and 24.5% of glycol monoethyl-ether acetate.

d. 50.00% of a finely divided synthetic yellow iron oxide ground in a jet mill, 16.70% of polyester-urethane from Example 4, 32.64% of glycol monoethyl-ether acetate and 0.66% of a dispersion consisting of 15parts by weight of a special magnesium montmorillonite treated with organic ammonium bases, 79parts by weight of xylene and 6 parts by weight of glycol monoethyl-ether acetate.

Instead of being ground with glass beads of 0.3-0.4 mm diameter, the pigment dispersions (c) and (d) are ground with glass beads of 0.6-0.9 mm diameter.

EXAMPLE 7

A resin product prepared by the following process is used instead of the polyester-urethane employed in Examples 4, 5 and 6:

3.1 g of 1,2-propylene glycol and 89 g of 1-isocyanato-3-isocyanato-methyl-3,5,5-trimethylcyclohexane are added to 120 g of a polyester, containing 1.7% of hydroxyl groups, from 5 mols of adipic acid, 3.5 mols of diethylene glycol and 2.3 mols of 2,2-bis-(4-hydroxy-cyclohexyl)-propane, at 125° to 135° C and the mixture is then heated to 240° C for 45 minutes, during which 2 liters of $CO_2$ (23° C) are eliminated. After cooling to 160° C, sufficient glycol monoethyl-ether acetate is added that after addition of 30 g of 2,2-dimethyl-1,3-propane-diol and subsequent reaction for 1 hour at 150° C, a 50% strength resin solution is obtained.

EXAMPLE 8 a. 4 g of the paste from Example 5 or 7, containing 18% of carbon black, are introduced, with stirring, into a solution consisting of 30 g of a crosslinkable polyester-polyurethane with terminal OH groups and 70 g of ethyl acetate. After stirring from about 2 minutes, a homogeneously coloured polyurethane solution is obtained, which after addition of a polyisocyanate of 13% NCO content and of a heavy metal salt is suitable as an accelerator for coating textiles by the reverse coating or direct coating process.

b. 10 g of the pastes from Example 6 or 7 are introduced, with stirring, into 100 g of the same 30% strength solution of a polyester - urethane in ethyl acetate. Even after brief stirring, the polyester - urethane solution acquires a homogeneous colouration and after addition of polyisocyanate and accelerator this solution gives speck-free coatings by the direct coating or reverse coating process.

c. 4 g of the 18% strength carbon black paste from Example 5 or 7, or 10 g of the pastes from Example 6 or 7, are introduced, with stirring, into a solution which consists of 25 g of a polyester-urethane, 45 ml of dimethylformamide and 30 ml of methyl ethyl ketone. In each case, homogeneously coloured polyurethane solutions are obtained after brief subsequent stirring. These pastes are miscible with one another and give uniform, very glossy coatings on textiles by the customary coating process.

The one-component polyurethane used is prepared from a polyester of adipic acid and hexanediol/neopentyl glycol of average molecular weight 500–3,000 and diphenylmethane-4,4'-diisocyanate, with subsequent reaction with butanediol.

d. 9.5 g of the 60% strength titanium dioxide paste from Example 6 or 7 and 0.5 g of the 50% strength yellow iron oxide paste from Example 6 or 7 are introduced, whilst stirring, into 100 g of a 25% strength solution of a non-yellowing polyester-urethane in equal parts of toluene and isopropanol, prepared from a polyester of molecular weight 1,000 with hexanediol, neopentyl glycol and adipic acid as well as isophoronediiso-cyanate and isophoronediamine. After brief stirring, a uniformly coloured polyurethane solution is obtained, the colour shade of which is stable even after prolonged storage, and which gives very glossy textile coatings by customary processes.

EXAMPLE 9

10 g of the black paste from Example 7, containing 18% of carbon black, are introduced, with stirring, into 100 g of a 50% strength solution of a polyacrylate containing hydroxyl groups (4.2% hydroxyl group content, calculated relative to solid binder) in equal parts of glycol monoethyl-ether acetate and xylene, catalysed with a tertiary amine. Thereafter, 30 g of an aliphatic polyisocyanate containing 16% of NCO are mixed in. The lacquer applied to a contrast paper be means of a 100 μm doctor blade dries to give a black, very glossy film. A cast film, in glass, of the reactive lacquer diluted 1:1 with a solvent mixture of equal parts of glycol monoethyl-ether acetate, butyl acetate and xylene, gives, after drying, a very glossy, brownish lacquer coating of high transparency, without signs of flocculation.

EXAMPLE 10

6 g of a finely divided synthetic red iron oxide and 5 g of a 40strength solution of a polyester-urethane, in which carbodiimide groups have been produced by catalysis with phospholine oxide, in glycol monoethyl-ether acetate, are added to 25 g of a 40% strength solution of a polyester containing hydroxyl groups, of approx. 8% OH content, in glycol monomethyl-ether acetate, in a 125 cm$^3$ polyethylene vessel containing 100 g of glass beads of 5 mm diameter. This charge is dispersed, in the closed vessel, for 30 minutes on a paint shaker. A charge which merely contains the same amount of the solution of the polyester containing hydroxyl groups and of the red iron oxide and which is dispersed with the same amount of glass beads for 30 minutes on the paint shaker. is run in parallel. The vessels are opened after standing 1 hour. The grinding charge with the added carbodiimide runs smoothly down the walls of the vessel whilst the charge without this addition shows pronounced flocculation on running down the walls of the vessel. These great differences with regard to flocculation are also recognisable in the lacquer films of the two-component polyurethane lacquers produced from these charges. After adding, in each case, 12 g of a 75% strength solution of an aliphatic polyisocyanate with an NCO content of approx. 16%, both batches are spread alongside one another on aluminium foil, with the aid of a doctor blade of 100 μm gap width. After drying the lacquer films, the charge with the additive shows a distinctly more yellowish shade. On rubbing out the spread lacquer films (rub-out test) the colour shade of this batch does not change, whilst that of the parallel experiment assumes a distinctly more yellowish shade, corresponding to that of the batch with the additive, in the areas which have subsequently been rubbed with the finger tip.

The polyester-urethane resin employed here can be prepared as follows:

0.22 g of phospholine oxide is added to 222 g of 1-isocyanato-3-isocyanato-methyl-3,5,5-trimethylcyclohexane and the mixture is heated to 125° C until 5 liters of $CO_2$ (at 23° C) have been eliminated. At this stage, 22.7% of the NCO groups have been converted into carbodiimide groups.

194 g of the above product are reacted with a mixture of 40 g of ethylene glycol, 7 g of 1,2-propylene glycol and 280 g of a polyester, containing 1.6% of hydroxyl groups, from 5 mols of adipic acid, 3.5 mols of diethylene glycol and 2.3 mols of 2,2-bis-(4-hydroxy-cyclohexyl)-propane, at 125° to 170° C. The reaction product contains 1.5% of hydroxyl groups.

EXAMPLE 11

32 g of a tetrachlorothioindigo pigment (Pigment Red 88) are dispersed in 168 g of a 30% strength solution of a polyester-urethane, possessing carbodiimide groups, in glycol monoethyl-ether acetate, in a 1 liter laboratory vibratory mill, using 700 g of porcelain balls of diameter 0.8 to 1 cm, for 6 hours. A very readily pourable pigment concentrate results, which can be used to colour, without signs of flocculation, a two-component polyurethane lacquer; for this purpose, 25 g of the above pigment concentrate are added to 70 g of a 28.6% strength solution of branched polyesters containing hydroxyl groups (hydroxyl content approx. 7.6%) in a solvent mixture of ethyl acetate, butyl acetate, glycol monoethyl-ether acetate and toluene. After mixing, 30 g of a 75% strength solution of a polyfunctional aromatic isocyanate with an NCO content of approx. 13% are stirred in. This two-component lacquer, pigmented red-violet, shows a high gloss when applied to aliminium foil; a lacquer coating applied to glass by casting shown high transparency with excellent pigment distribution.

The polyester-urethane resin used here can be obtained as follows:

886 g of 1-isocyanato-3-isocyanato-methyl-3,3,5-trimethylcyclohexane are reacted with 84 g of cyclohexanol and the mixture is heated to 240° until 20 liters of $CO_2$ (20° C) have been eliminated. After cooling, the reaction product is introduced into a mixture of 300 g of 2,2-dimethyl-1,3-propanediol and 1,200 g of a polyester, containing 1.7% hydroxyl groups, from 5 mols of adipic acid, 3.5 mols of diethylene glycol and 2.3 mols of 2,2-bis-(4-hydroxy-cyclohexyl)-propane, and the solids content of the mixture is adjusted to 50% with glycol monoethyl-ether acetate. The IR spectrum of the end product shows the band at 4.75 μm which is characteristic of the carbodiimide group.

EXAMPLE 12

12 g of a synthetic transparent yellow iron oxide with an average particle size of 0.02 μm are dispersed, over the course of 8 hours, in 24 g of a 50% strength solution of a modified polycaprolactone in glycol monoethyl-ether acetate and 112 g of a 50% strength solution of a polyester (OH content approx. 8%) in glycol monomethyl-ether acetate, in a ½ liter vibratory ball mill with 350 g of porcelain balls of 5 mm diameter as the grinding bodies. Thereafter, 69.5 g of a 75% strength solution of an aliphatic polyisocyanate with 16.5% NCO are added to the ground material. The lacquer, applied by means of a doctor blade with 100 μm gap width onto black-and-white contrast paper dries to give a very glossy film coloured transparent golden yellow.

The modified polycaprolactone which contains carbodiimide groups is prepared as follows:

199.35 g of 1-isocyanato-3-isocyanato-methyl-3,5,5-trimethylcyclohexane are added to a mixture of 70.65 g of a polycaprolactone containing hydroxyl groups (hydroxyl content about 6.5%) obtained by using diethylene glycol as the starter, and 9.4 g of cyclohexanol, and the mixture is kept at a temperature of 240° C until 4.5 liters of $CO_2$ (25° C) are eliminated. After cooling, 339.4 g of glycol monoethyl-ether acetate and 68.2 g of 2,2-dimethyl-1,3-propanediol are added successively. The reaction is concluded within 1 hour at 150° C. The viscosity of the 50% strength resin solution in glycol monoethyl-ether acetate is 306 centipoise (measured in a Hoppler viscometer at 25° C).

EXAMPLE 13

0.8 of a surface-oxidised carbon black pigment (specific surface area, by the BET method: 180 m²/g) is dispersed in 25 g of a 40% strength solution of a polyester containing hydroxyl groups, with an OH content of approx. 8%, in glycol monomethyl-ether acetate for 30 minutes in a 125 cm³ polyethylene vessel, using 100 g of glass beads of diameter 5 mm, on a paint shaker.

An identical charge except for the addition of 4 g of a 40% strength solution of a carbodiimide-containing polyurethane in toluene, is dispersed in parallel. Even after brief standing (about 30 minutes) it can be seen that only the second charge remains homogeneous in colour, whilst the first shows distinct flocculation when running down the side of the vessel. The carbodiimide-containing polyurethane resin without ester groups of ether groups can be obtained by the following process:

7.6 g of 1,2-propylene glycol are added to 2C g of 1-isocyanato-3-isocyanato-methyl-3,5,5-trimethylcyclohexane. After heating to 240°-250° C, 15 liters of $CO_2$ (25° C) are eliminated over the course of 1.2 hours. In addition to urethane and NCO, the IR spectrum only shows a very strong carbodiimide band. After cooling, and adding 35 g of 2-ethylhexanediol-1,3, a carbodiimide resin which is free of isocyanate groups and gives a clear solution in toluene is produced.

EXAMPLE 14

157 g of a polyester from adipic acid and diethylene glycol, which has to a linear structure and contains 1.3% of hydroxyl groups, are reacted with a mixture of 3 g of 1,2-propylene glycol and 89 g of 1-isocyanato-3-isocyanato-methyl-3,5,5-trimethylcyclohexane and the mixture is then heated to 240° C for 1 hour, during which 2 liters of $CO_2$ (20° C) are eliminated. A very viscous resin containing carbodiimide groups is obtained, which is soluble in phthalate plasticisers or phosphate plasticisers.

20 g of a surface-oxidised carbon black pigment are dispersed in 80 g of a 20% strength solution of this resin in diphenyl-2-ethylhexyl phosphate in a cone mill. A very readily pourable pigment paste is obtained, by means of which a very deep colour is produced in polyester-urethane foams by stirring 10 g of the black pigment paste into a mixture of 200 g of a slightly branched polyester from adipic acid, diethylene glycol and trimethylolpropane, having an OH number of 50, and 73.2 g of toluylenediisocyanate, and causing the mixture to form by the customary addition of water and auxiliaries.

EXAMPLE 15

100 g of cyclohexanol are first introduced over the course of 20 minutes, whilst stirring, into 174 g of toluylenediisocyanate, consisting of 80% of toluylene-2,4-diisocyanate and 20% of toluylene-2,6-diisocyanate, starting at 125° C; after completion of the first reaction 73 g of 2-ethyl-1,3-hexanediol are introduced at 140° C, whereupon the temperature rises to 165° C. After 30 minutes, 0.5% of phospholine oxide is added and the temperature is raised to 190° C. In the course thereof, 2 liters of $CO_2$ (25° C) are eliminated within 50 minutes. The resin shows the carbodiimide band in the infrared spectrum at 4.75 μm.

20% of a lamp black having a BET surface area of 110 m²/g (pH value of the aqueous suspension = 5) can be dispersed by means of a corundum disc mill in a 10% strength solution of the resin in a branched polyester having an average molecular weight of 4,800, so as to give a pourable carbon black paste. This paste is very suitable for foaming in moulds, using diphenylmethane-4,4'-diisocyanate as the polyisocyanate component. However, the paste can also be used to colour solvent-containing one-component lacquers with reactive NCO groups, shortly before the lacquers are used.

EXAMPLE 16

20 g of a surface-oxidised carbon black pigment having a BET surface area of 180 m²/g are dispersed in 80 g of a 30% strength solution of the resin from Example 15, containing carbodiimide groups, in diphenyl cresyl phosphate over the course of 30 minutes on a paint shaker using glass beads of 3 mm diameter. A carbon black paste which is very readily pourable and is distinguished by high resistance to flocculation is obtained. The paste is particularly suitable for colouring ester-based polyurethane foams.

EXAMPLE 17

75 g of cyclohexanol are first introduced over the course of 20 minutes, whilst stirring, into 174 g of toluylene-diisocyanate, consisting of 80% of toluylene-2,4-diisocyanate and 20% of toluylene-2,6-diisocyanate, starting at 125° C; after completion of the first reaction 100 g of 2-ethyl-1,3-hexanediol are introduced at 140° C, whereupon the temperature rises to 165° C. After 30 minutes, 0.5% of phospholine oxide is added and the temperature is raised to 190° C. In the course thereof, 2 liters of $CO_2$ (25° C) are eliminated within 50 minutes. The resin shows the carbodiimide band in the infrared spectrum at 4.75 um. The resin contains 2.4% hydroxyl groups and has a viscosity, measured in the Hoppler falling ball viscosimeter at 25° C in a 35% strength solution in a polyether with a molecular weight of 4800 of 536 poise.

15 g of a lamp black having a BET surface area of 110 m²/g (pH value of the aqueous suspension = 5) is dispersed by means of a corundum disc mill in 85 g of a 1.2% strength solution of the resin in a branched polyether having an average molecular weight of 4,800, prepared from trimethylolpropane with 87% propyleneoxide and 13% ethyleneoxide, so as to give a pourable carbon black paste. This paste is very suitable for foaming in moulds, using diphenylmethane-4,4'-diisocyanate as the polyisocyanate component. However, the paste can also be used to colour solvent-containing one-component lacqueres with reactive NCO groups, shortly before the lacquers are used.

We claim:

1. Process for the pigmentation of a synthetic macromolecular material comprising incorporating into said macromolecular material a pigment preparation comprising an inorganic or organic pigment in the amount of from 3 to 80% by weight of said preparation, a carbodiimide resin pigment vehicle in the amount of from 0.5 to 85% by weight of said preparation, and an organic solvent free from amino groups in the amount of from 0 to 75% by weight of said preparation, wherein additional functional groups on said carbodiimide resin comprise urethane, ester, ether or hydroxyl groups or a combination thereof.

2. The process of claim 1, wherein said carbodiimide resin pigment vehicle is present in an amount of from 6 to 85% of said pigment preparation.

3. Process of claim 2 wherein said pigment is an organic pigment or carbon black comprising from 20 to 50% by weight of said preparation and said resin pigment vehicle comprises from 80 to 50% by weight of said preparation.

4. Process of claim 2 wherein said macromolecular material comprises a one-component or two-component polyurethane textile coating composition.

5. Process of claim 2 wherein said macromolecular material is a coating agent.

6. Process of claim 2 wherein said macromolecular material is a cellular polyurethane.

7. Process of claim 2 wherein said macromolecular material is a polyurethane lacquer binder.

8. Process of claim 7 wherein said pigment comprises carbon black, phthalocyanine, yellow iron oxide or red iron oxide.

9. Process of claim 6 wherein said pigment comprises carbon black.

10. Process of claim 2 wherein said inorganic pigment comprises from 30 to 80% by weight of said preparation and said resin comprises from 70 to 20% by weight of said preparation.

11. Process of claim 2 wherein said pigment comprises from 3 to 70% by weight of said preparation, said resin comprises from 6 to 40% by weight of said preparation, and said solvent comprises from 82 to 15% by weight of said preparation.

* * * * *